Jan. 5, 1954   S. D. RUSSELL   2,664,684
COMBINATION HAYING MACHINE
Filed Nov. 2, 1949   3 Sheets-Sheet 1
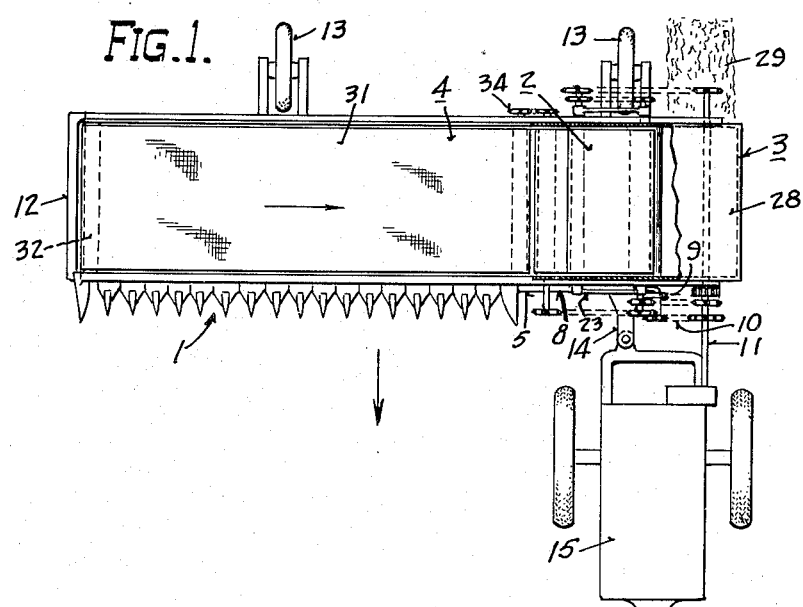
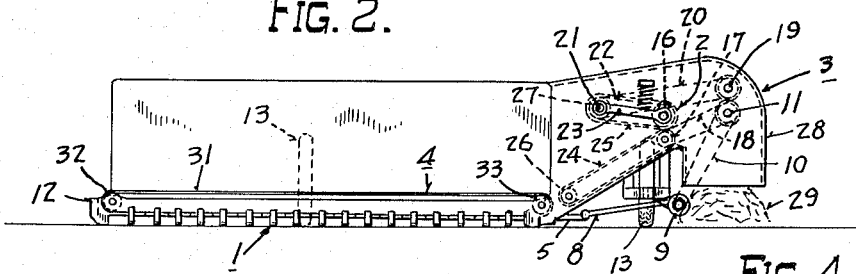
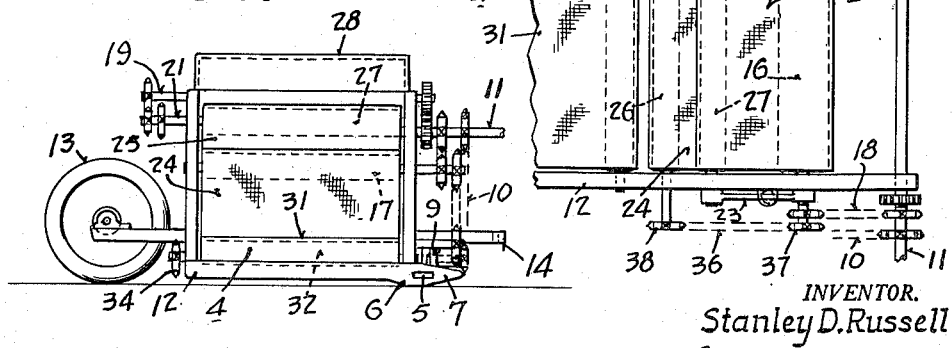
INVENTOR.
Stanley D. Russell
BY
ATTORNEYS.

Jan. 5, 1954 S. D. RUSSELL 2,664,684
COMBINATION HAYING MACHINE
Filed Nov. 2, 1949 3 Sheets-Sheet 2
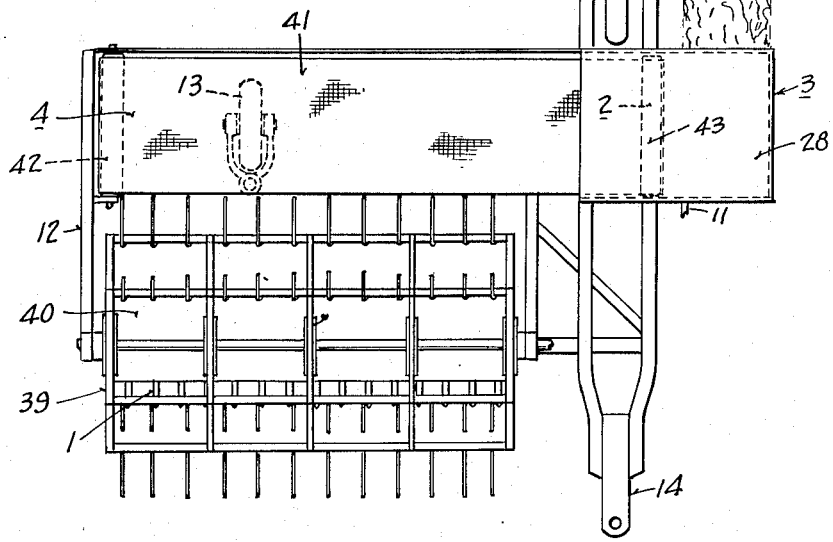
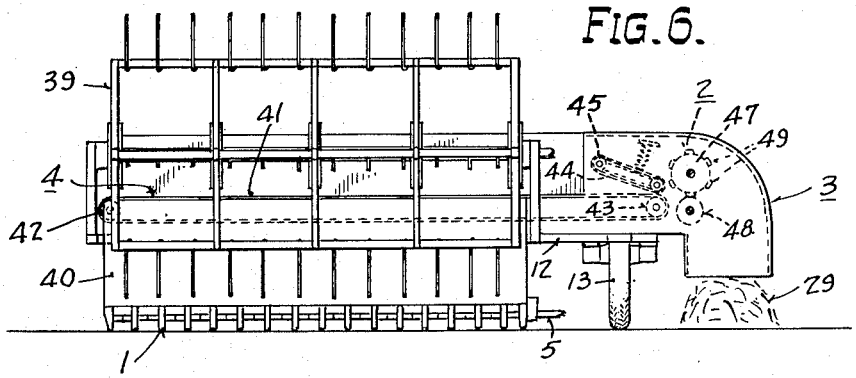
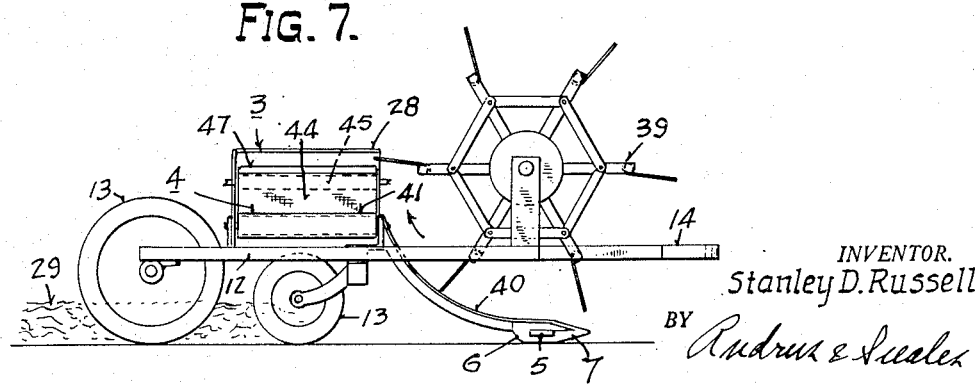
INVENTOR.
Stanley D. Russell
BY
ATTORNEYS.

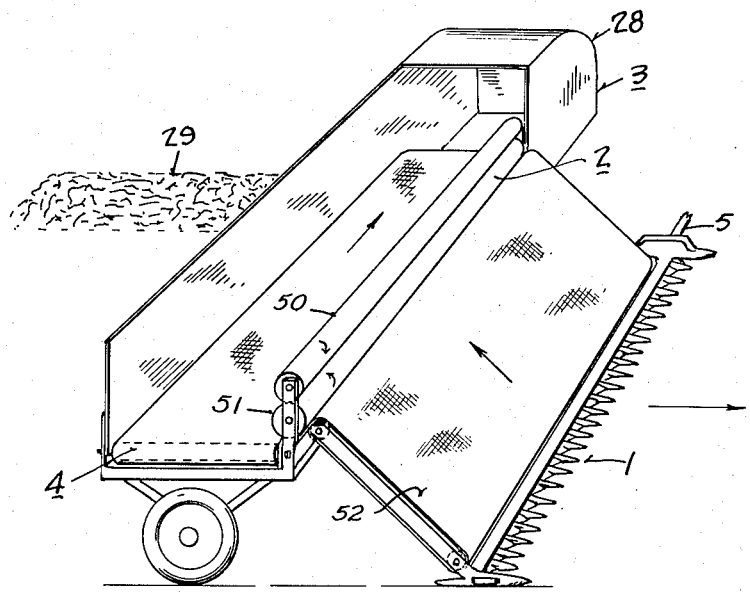
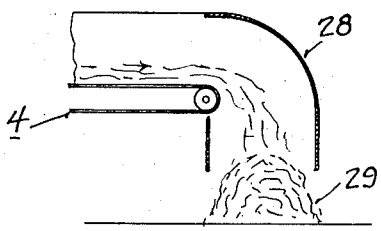
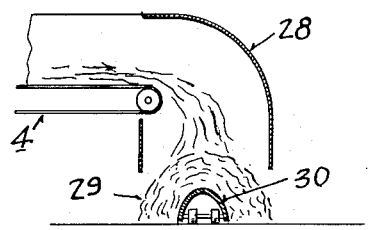
INVENTOR.
Stanley D. Russell
BY
ATTORNEYS.

Patented Jan. 5, 1954

2,664,684

UNITED STATES PATENT OFFICE 2,664,684

COMBINATION HAYING MACHINE

Stanley D. Russell, Racine, Wis., assignor to J. I. Case Company, Racine, Wis., a company of Wisconsin Application November 2, 1949, Serial No. 125,101

4 Claims. (Cl. 56—1)

This invention relates to a combination haying machine providing for the mowing, crushing and windrowing of hay in a single combined operation.

One of the principal objects of the invention is to combine the several operations of mowing, crushing and windrowing of hay in a single, simple apparatus.

Another object is to provide an improved crusher for hay.

Another object is to provide an improved feed for hay crushing mechanism.

Another object is to provide for the more uniform crushing of the hay.

Another object is to provide a simple tractor power take-off drive for a combination hay mower, crusher and windrower.

Another object is to provide a light-weight tractor drawn implement for mowing, crushing and windrowing hay.

Another object is to provide an improved elevating mechanism for feeding freshly cut hay to a crusher in a combination field haying machine.

Other objects and advantages of the invention will appear hereinafter in the detailed description of embodiments of the invention.

In the accompanying drawings:

Figure 1 is a top plan view of a combination haying machine embodying the invention;

Fig. 2 is a front elevation of the machine of Fig. 1;

Fig. 3 is an enlarged end elevation of the machine of Fig. 1 taken from the mower end with the covering casing and the tractor omitted;

Fig. 4 is an enlarged top plan view of the crusher shown in Figs. 2 and 3 with the covering casing removed;

Fig. 5 is a top plan view of a modified construction showing a reel type elevator;

Fig. 6 is a front elevation of the machine of Fig. 5;

Fig. 7 is an end elevation of the machine of Fig. 5 taken from the mower end, similar to Fig. 3;

Fig. 8 is a perspective view of a modified form of machine in which the crusher rolls extend transversely to the line of travel;

Fig. 9 is a schematic showing of the formation of a solid windrow; and

Fig. 10 is a similar showing of the formation of a hollow windrow, similar to that described in applicant's co-pending application, Serial No. 746,042, now Patent No. 2,620,611, filed May 5, 1947.

The machine of the present invention combines in a single structure a mower 1, a crusher 2 and a windrower 3, with appropriate conveying mechanism 4 therebetween, whereby, with a single pass, of the machine, over the standing crop in a field it is possible to produce windrows of crushed hay, which are ready for pick up and baling or transportation to the barn after a short drying.

The advantage of combining the operations referred to arises from the fact that haying time is usually critical due to moisture and weather conditions. The drying of crushed hay is faster due to the exposure of the internal juices to the atmosphere and wind when the hay is in a windrow. The hay curing time is thereby shortened and the hay is made ready for final baling or storage without undue waiting and with but a single pass over the field. Raking operations are eliminated and handling of the hay is reduced to a minimum, thereby substantially reducing hay loss from dropping of leaves and the like. Similarly contamination of the hay by excess contact and entanglement with dirt and stones is avoided.

The mower mechanism 1 comprises a forwardly directed transversely extending reciprocating sickle bar 5 operating in a guide rail 6 having shoes 7. The sickle bar 5 is driven by any suitable means, usually a pitman 8 operated by the rotating crank 9 which is turn is driven by a suitable chain 10 from the power take-off shaft 11 for a tractor drive.

The mower mechanism 1 is carried by a frame 12 which is supported at the rear of the machine by suitable wheels 13 riding on the ground and at the front, at one end of the sickle bar by a tractor hitch 14 and tractor 15.

The crusher mechanism 2 comprises the upper and lower crusher rolls 16 and 17, respectively, preferably disposed at one end of the mower mechanism 1 and generally parallel to the direction of travel for the machine.

Both rolls 16 and 17 are driven by the power take-off shaft 11. For this purpose a chain 18 drives lower roll 17 directly from a sprocket on shaft 11. An intermediate shaft 19 disposed above shaft 11 and generally parallel thereto is geared directly to shaft 11 to be driven thereby in a reverse direction. A chain 20 drivingly connects shaft 19 and the shaft 21 and chain 22 operating from shaft 21 drives upper roll 16. The roll 16 is mounted on arms 23 extending from shaft 21 to provide for pivoted floating of the roll on the shaft 21, and the roll 16 is suitably spring biased toward the lower crusher roll 17.

The rolls 16 and 17 are of the same length and should be sufficiently short in length to prevent excess springing apart at the center. By positioning the crusher rolls 16 and 17 as described they can be substantially shorter than the sickle bar 5, a feature which permits the use of a long sickle bar giving a wide swath cut.

By driving the crusher rolls directly from take-off shaft 11, in the manner indicated, it is not necessary to employ beveled gearing, and the speed need not be reduced from the standard speed of about 550 R. P. M. of most tractor power take-offs.

Various crusher roll constructions may be employed in the general combination of the invention. Where the crusher rolls 16 and 17 are relatively short as in small machines they may be constructed of single cylindrical members integral for the full length and having end trunnions operating in suitable bearings. The upper roll 16 should be floating under a heavy spring pressure biasing the same toward the lower roll 17 as described.

The rolls 16 and 17 of the crusher mechanism 2 are cylindrical, of generally smooth contour and carry corresponding ends of the upper apron 25, and the inclined endless feed apron 24, respectively.

The opposite, lower end of apron 24 carried by the roller 26 is disposed adjacent the end of conveyor 4 to receive the plants therefrom as described. The corresponding opposite end of the upper apron 25 is carried by roller 27 which is mounted on shaft 21 and is spaced substantially above the lower feed apron 24 to allow the plants to pass therebeneath to be initially compacted between aprons 24 and 25 as they approach the crushing rolls 16 and 17.

The crop material is actually crushed between aprons 24 and 25 passing over rolls 16 and 17. Both aprons may be of canvas and may have a coating of soft rubber to give the effect of a wringer in the crushing operation.

The crusher mechanism 2 is disposed to discharge the crushed hay or crop material into the windrower 3 comprising a housing 28 which is open at the bottom, whereby the material drops onto the ground in a narrow windrow 29 trailing the machine.

The inclination of apron 24 need not be very great, and should not be such as to interfere with the feeding of the crop material to the crusher rolls.

The windrow 29 may be either of the so-called solid type shown in Fig. 9 and in which the hay is merely dropped upon the ground loose as the machine moves forward, or it may be of the hollow type shown in Fig. 10, by dropping the same upon the form 30, as shown in applicant's copending application Serial No. 746,042, filed May 5, 1947, above referred to.

The conveyor mechanism 4 comprises an endless belt conveyor 31 extending horizontally behind the mower mechanism 1 and mounted upon a pair of end rolls 32 and 33 disposed parallel to crusher rolls 16 and 17 and at the opposite ends of the sickle bar 5.

The width of the conveyors 24 and 31 should correspond to the length of the crusher rolls. The speed of movement of the conveyors may vary depending upon the results desired.

The drive for apron 24 has been described previously as comprising chain 18 from the power take-off shaft 11. The drive for conveyor 31 comprises a pair of sprockets 34 disposed at corresponding ends of the rolls 33 and 26 and connected by chain 35. In addition, in case there is any tendency for apron 24 to slip upon roll 26, a chain 36 is provided between corresponding drive and driven sprockets 37 and 38 at corresponding ends of rolls 17 and 26, respectively.

The construction of Figs. 5 through 7 avoids the use of the inclined apron 24, and instead, conveyor 4 is disposed at the height of the lower crusher roll 17 and may even pass thereover, if desired. In this construction the hay is elevated from the sickle bar 5 by means of a reel 39 which serves the purpose of the usual harvester reel, and which additionally serves to elevate the freshly cut hay to the conveyor 4. For this purpose, a curved sheet metal ramp 40 is provided adjacent the path of the reel blades and extending from just behind sickle bar 5 to the front edge of the top flight of conveyor 4.

The blades of reel 39 move the crop material upwardly and rearwardly along the surface of ramp 40 and discharge the same onto conveyor 4 comprising the apron 41 carried by the cylindrical rolls 42 and 43.

The position of the stalks of crop material relative to the crusher rolls which will be hereinafter described may be adjusted for the particular material by increasing or decreasing the speed of conveyor 4. When conveyor 4 moves rapidly it has a tendency to pull the tops of the cut plants toward the crusher rolls before the butt ends are free from the succeeding plants being cut. This effects a diagonal positioning of the plants upon conveyor 4 and the plants tend to pass through the crusher rolls, on a bias head first. The diagonal slant of the plants can be changed by increasing or decreasing the speed of operation.

The machine may have a feed control apron 44 carried by the roller 45 which is disposed and spaced above the conveyor apron 41, and by the roller 46 immediately above roll 43 carrying the apron. Roller 46 is preferably mounted to float and is spring biased downwardly against roll 43 to compact the plants as they reach the end of apron 41 of conveyor 4 into a heavy mat.

The crusher rolls comprise the power driven upper and lower rolls 47 and 48 and are disposed adjacent the end of conveyor 4 to receive the compacted plants. The larger upper roll 47 is provided with a plurality of spaced rub-bars 49 extending longitudinally of the roll and which crush the plants against the lower smooth cylindrical roll 48.

In the operation of the crusher and apron mechanism of Figs. 5 through 7 the conveyor belt is adapted to carry a fairly heavy stream of plants at a moderate linear velocity of between, for example, 300 to 600 feet per minute corresponding to the capacity of the cutter. The rolls 47 and 48 are driven to rotate in opposite directions at considerably higher peripheral speeds of between 3000 to 6000 feet per minute depending on the nature of the material to be crushed. The rolls withdraw the plants in a thin stream from the retarded thicker mat of plants which is continuously discharged from between aprons 41 and 44.

In practice it has been found that a ratio of approximately 9:1 between the linear velocities of the conveyor and the crushing rolls provides a uniform crushing and tearing of the stalks passing between rolls 47 and 48. The uniformity provided in crushing makes possible the cutting, curing and baling of the crop in the same day.

If desired, an additional retarding of the crop material at the point of discharge from the conveyor may be obtained by operating the feed control apron 44 at a lower speed than the conveyor apron 41. This tends to gather the hay between the two aprons and to hold it against the pull of the crushing rolls 47 and 48.

Another modification of the broad aspect of the invention is illustrated in the embodiment shown in Fig. 8, which does not have many of the detail features and advantages of the other embodiments illustrated.

In Fig. 8 the crushing rolls 50 and 51 are disposed parallel to sickle bar 5 and have the same length. An inclined apron 52 receives the cut hay from a sickle bar 5 and carries the same rearwardly upward and into the crusher rolls. The conveyor 4 lies back of the crusher rolls and transports the crushed crop material laterally to the windrow housing 28 where the material drops off from the end of the conveyor and onto the ground in a trailing windrow formation.

The several embodiments of the invention described comprise a mower, crusher and windrower combined in a single machine which eliminates excess handling of hay in the field and leaves the hay in a crushed condition for rapid windrow drying.

The invention may have various embodiments within the scope of the following claims.

I claim:

1. In combination in a single haying machine, a mobile frame, a sickle mower of substantial length carried by said frame, an inclined apron on said frame behind the mower disposed to receive the cut crop material, a pair of crusher rolls carried by said frame at the upper end of the apron having a length generally corresponding to the length of the mower and adapted to crush crop material fed thereto by said apron, a cross conveyor carried by the frame behind and on the discharge side of said crusher rolls to convey the crushed material therefrom to one side of the machine, and a windrower operatively associated with said last-named conveyor and serving to drop the crushed crop material onto the ground in windrow formation.

2. In a machine of the class described, a mobile frame, a mower carried by the frame and facing forwardly thereof, a reel carried by the frame and facing forwardly thereof to engage standing crop material and to tip the same rearwardly as it is cut by said mower, a curved ramp corresponding in curvature generally to the outer path of the reel carried by said frame and extending rearwardly and upwardly from said mower to receive fallen cut crop material, said reel being disposed to co-operate with said ramp to effect upward movement of the crop material and discharge of the same rearwardly at the top of the ramp, an endless belt conveyor carried by the frame at the top of the ramp and extending transversely of the machine to receive crop material from the ramp and deliver the same laterally to one side of the machine, crusher means operatively associated with said conveyor for crushing the crop material, and means to discharge the crop material from said crusher means in windrow formation upon the ground.

3. In combination in a single haying machine, a mobile frame, a sickle mower of substantial length carried by said frame and facing forwardly thereof to cut crop material, a conveyor means on said frame and operatively associated with said mower to receive cut material therefrom, a pair of coacting crusher means carried by said frame and operatively associated with said conveyor to receive cut material therefrom, and a windrower carried by said frame in operative association with said crusher means to receive crushed material therefrom and to deposit the same upon the ground in a windrow trailing the machine at the side opposite from the standing crop material as the machine moves along the edge of a stand of crop material.

4. The combination of claim 3 in which said crusher means are disposed adjacent the windrower and constitute a pair of rolls substantially shorter than the length of the sickle mower with the axes of the rolls extending substantially parallel to the line of travel of the frame, and said conveyor means includes a transverse belt behind the sickle mower and disposed to carry the cut crop material from the mower to the crusher rolls.

STANLEY D. RUSSELL.

References Cited in the file of this patent

UNITED STATES PATENTS

| Number | Name | Date |
| --- | --- | --- |
| 79,871 | Sprague | July 14, 1868 |
| 1,823,387 | Campbell | Sept. 15, 1931 |
| 1,905,410 | Innes | Apr. 25, 1933 |
| 1,938,264 | Templeton | Dec. 5, 1933 |
| 1,958,910 | Christiansen | May 15, 1934 |
| 1,960,596 | Rimple | May 29, 1934 |
| 1,972,680 | Cushman | Sept. 4, 1934 |
| 2,114,580 | Thompson | Apr. 19, 1938 |
| 2,342,282 | Hill | Feb. 22, 1944 |
| 2,345,715 | Reed | Apr. 4, 1944 |